US 11,365,363 B2

(12) United States Patent
Fu et al.

(10) Patent No.: US 11,365,363 B2
(45) Date of Patent: Jun. 21, 2022

(54) SYSTEM FOR PRODUCING HIGH-QUALITY GAS

(71) Applicant: Shandong University of Technology, Shandong (CN)

(72) Inventors: Peng Fu, Zibo (CN); Yongjun Li, Zibo (CN); Yuchun Zhang, Zibo (CN); Bing Wang, Zibo (CN)

(73) Assignee: Shandong University of Technology, Shangdong (CN)

( * ) Notice: Subject to any disclaimer, the term of this patent is extended or adjusted under 35 U.S.C. 154(b) by 278 days.

(21) Appl. No.: 16/865,523

(22) Filed: May 4, 2020

(65) Prior Publication Data

US 2021/0115345 A1    Apr. 22, 2021

(30) Foreign Application Priority Data

Oct. 21, 2019  (CN) .......................... 201911000071.2

(51) Int. Cl.
| | |
|---|---|
| *C10J 3/48* | (2006.01) |
| *C10J 3/12* | (2006.01) |
| *C10J 3/80* | (2006.01) |
| *C10J 3/84* | (2006.01) |
| *C10K 1/18* | (2006.01) |

(52) U.S. Cl.
CPC ................. *C10J 3/485* (2013.01); *C10J 3/12* (2013.01); *C10J 3/80* (2013.01); *C10J 3/84* (2013.01); *C10K 1/18* (2013.01); *C10J 2300/0916* (2013.01); *C10J 2300/0946* (2013.01); *C10J 2300/0973* (2013.01); *C10J 2300/1269* (2013.01); *C10J 2300/1292* (2013.01); *C10J 2300/1838* (2013.01); *Y02P 20/133* (2015.11)

(58) Field of Classification Search
CPC ....... C10J 3/485; C10J 3/12; C10J 3/80; C10J 3/84; C10J 2300/0916; C10J 2300/0946; C10J 2300/0973; C10J 2300/1269; C10J 2300/1292; C10J 2300/1838; C10J 2300/0993; C10K 1/18
See application file for complete search history.

(56) References Cited

U.S. PATENT DOCUMENTS

| | | | | |
|---|---|---|---|---|
| 3,853,498 | A  * | 12/1974 | Bailie ........................ | C10J 3/58 201/31 |
| 8,545,579 | B2 * | 10/2013 | Nukumi ................ | F23G 5/0276 48/89 |
| 2008/0290000 | A1 * | 11/2008 | Towler ..................... | C10G 1/02 422/600 |
| 2010/0119440 | A1 * | 5/2010 | Muehlen ................. | C10B 47/44 423/650 |

(Continued)

*Primary Examiner* — Matthew J Merkling
(74) *Attorney, Agent, or Firm* — Gardner Linn (57) ABSTRACT

A system for producing high-quality gas includes a heat carrier hoist, a coke feeder, a heat carrier heating furnace, a gas mixer, a high-temperature induced draft fan, a heat carrier storage tank, a dryer, a hopper, a concentrating solar collection pyrolysis-gasification reactor having a double-tube structure, a three-phase separator and a coke collecting bin. The system may use an adjustable concentrating solar collection technology in combination with a heat carrier circulation heating process, so as to effectively solve heat requirements of the waste pyrolysis and gasification process, reduce the waste material consumption caused by energy supply, and improve the effective utilization of raw materials.

10 Claims, 3 Drawing Sheets

(56) References Cited

U.S. PATENT DOCUMENTS

| | | | |
|---|---|---|---|
| 2010/0242353 A1* | 9/2010 | Jovanovic | B01J 19/245 |
| | | | 422/111 |
| 2012/0073198 A1* | 3/2012 | Goel | C10K 3/02 |
| | | | 48/197 R |
| 2012/0145965 A1* | 6/2012 | Simmons | C07C 29/152 |
| | | | 422/162 |
| 2013/0109765 A1* | 5/2013 | Jiang | C10G 2/00 |
| | | | 252/373 |
| 2015/0141536 A1* | 5/2015 | Zhang | C10K 1/02 |
| | | | 422/187 |
| 2018/0291278 A1* | 10/2018 | Jack | C10B 49/10 |
| 2020/0216768 A1* | 7/2020 | Nestler | C10J 3/721 |

* cited by examiner

SYSTEM FOR PRODUCING HIGH-QUALITY GAS

FIELD OF THE INVENTION

The present invention relates to the field of renewable energy utilization, and in particular to a system for producing high-quality gas.

BACKGROUND OF THE INVENTION

Gaseous fuel now becomes an indispensable crucial energy product in social and economic development and people's lives. However, with the growing shortage of energy resources, the contradiction between the demand and supply of the gaseous fuel is becoming increasingly intense. In addition, excessive usage of fossil fuels in transport may amplify the global greenhouse effect. Combustible solid wastes as carbon containing energy resources, such as agricultural and forestry residues, waste plastics, domestic garbage, sludge, waste circuit boards, and the like, have great energy and resource recovery potential, and can be used to produce high-quality gas. With the employment of such gaseous fuels, it is possible to reduce the amount of fossil fuels used, and achieve carbon recycling and thus reduce carbon dioxide emissions from an environmental perspective.

The pyrolysis-gasification technology of the combustible solid waste, known as a very promising thermochemical conversion technology, can convert low-grade waste into high-quality gas rich in CO and $H_2$, which can not only be efficiently utilized by the gas-vapor combined cycle unit, but also be used as raw gas for obtaining chemical products such as methanol and dimethyl ether, to seamlessly integrate existing related applications. Currently, various types of waste pyrolysis-gasification systems such as fixed beds, fluidized beds, and entrained-flow beds have been developed domestically and abroad, and demonstration or industrial installations have been established. Most of the energy required for the above pyrolysis/gasification systems is obtained by waste combustion. More than 20% of waste materials are needed to maintain energy required for pyrolysis-gasification operation, which can impact effective utilization of raw materials and increase production costs of the gaseous fuel, as well as cause new pollution. Additionally, gasification uses air as a gasification agent, which results in a high content of $N_2$ and $CO_2$ in the produced gas. The produced gas has a low-calorific-value that is usually in a range of 4-6 $MJ/m^3$. As a result, poor gas quality and availability limit its application. Further, a large amount of air is introduced into the reaction system due to self-heating. The introduced nitrogen flows into the subsequent gas condensation and purification process, which greatly increases the cooling energy consumption and reduces the tar collection efficiency, resulting in a high tar content in the gaseous fuel.

The above-mentioned disadvantages existing in the pyrolysis-gasification process of the combustible solid wastes have largely influenced the costs of producing gaseous fuel from pyrolysis-gasification of wastes and restricted industrial application of the existing technologies.

SUMMARY OF THE INVENTION

An objective of the present invention is to provide a system for producing high-quality gas, which can save the cost of producing gaseous fuel by pyrolysis-gasification of waste.

The above objective of the invention is realized by a system for producing high-quality gas, including a heat carrier hoist, a coke feeder, a heat carrier heating furnace, a gas mixer, a high-temperature induced draft fan, a heat carrier storage tank, a dryer, a hopper, a concentrating solar collection pyrolysis-gasification reactor having a double-tube structure, a three-phase separator and a coke collecting bin. An upper part of the heat carrier hoist is configured to be connected to a first input end of the heat carrier heating furnace, a lower part of the heat carrier hoist is configured to be connected to a first output end of the three-phase separator, a second input end of the heat carrier heating furnace is configured to be connected to the coke feeder, an input end of the coke feeder is configured to be connected to an output end of the coke collecting bin, and a third input end of the heat carrier heating furnace is configured to be connected to the gas mixer. A first output end of the heat carrier heating furnace is configured to be connected to an input end of the high-temperature induced draft fan, a second output end of the heat carrier heating furnace is configured to be connected to an input end of the heat carrier storage tank, an output end of the high-temperature induced draft fan is configured to be connected to an input end of the heat carrier storage tank, an output end of the heat carrier storage tank is configured to be connected to an input end of the dryer, an output end of the dryer is configured to be connected to an input end of the hopper, an output end of the hopper is configured to be connected to an input end of the reactor, an output end of the heat carrier storage tank is configured to be connected to the input end of the reactor through a heat carrier flow control valve, an output end of the reactor is configured to be connected to an input end of the three-phase separator, and a second output end of the three-phase separator is configured to be connected to an input end of the coke collecting bin through a flap valve.

Optionally, the pyrolysis-gasification reactor may include an adjustable concentrating solar collector, a transparent cavity, reaction tubes, a heat absorption coil, a vapor distributor, and a water tank.

The adjustable concentrating solar collector may be configured for receiving sunlight from the sun and reflecting the sunlight into the transparent cavity, which may be provided with the reaction tubes, the heat absorption coil, the vapor distributor and the water tank.

Two reaction tubes may be symmetrically arranged at a center of the transparent cavity. A first port may be arranged at an upper center of the transparent cavity, and a second port may be arranged at its lower center. Each reaction tube may include a first section, a second section communicating with the first section and a third section communicating with the second section. Upper ports of both the first sections may be configured to be communicated with the first port, and lower ports of both the third sections may be configured to be communicated with the second port.

The heat absorption coil may be arranged at a center between the reaction tubes. An inlet end of the heat absorption coil may be configured to be connected to an outlet end of the water tank. An outlet end of the heat absorption coil may be configured to be connected to an inlet end of the vapor distributor. Outlet ends of the vapor distributor may be configured to be connected to the inlet ends of the reaction tubes. Cold water in the water tank may be allowed to enter the heat absorption coil from a cold water outlet under the effect of the liquid level difference and be converted into vapor due to evaporation by absorbing heat, which may enter and flow through the vapor distributor, and then enter each of the reaction tubes. Meanwhile, waste material and solid heat carriers mixed at a set ratio may be configured to be fed from the first port into the reaction tubes, where a violent pyrolysis and gasification reaction occurs with the vapor during the dropping of the mixture to generate gasification gas and coke. Then, the gasification gas, the coke, and the solid heat carriers may be configured to be discharged from the second port.

Optionally, for each reaction tube, an angle between the first section and the second section may be an obtuse angle α, and an angle between the second section and the third section may be an obtuse angle β, where α=β.

Optionally, the first sections of both the reaction tubes may be provided with respective vapor inlets symmetrically.

Optionally, the heat absorption coil may be implemented as a helical heat absorption coil of copper, which has one end as a cold water inlet, which may be configured to be connected to the water tank, and the other end as a vapor outlet, which may be configured to be connected to the vapor distributor. A stop valve may be provided at the vapor outlet of the heat absorption coil.

Optionally, the vapor distributor may be provided with steady flow valves, an exhaust valve, a vapor inlet and vapor outlets. The vapor inlet of the distributor may be configured to be connected to the vapor outlet of the heat absorption coil, and the vapor outlets of the distributor may be configured to be connected to the vapor inlets of the reaction tube. The steady flow valve may be arranged at the vapor outlet of the distributor to adjust the vapor flow. The exhaust valve can be configured to ensure that the pressure in the vapor distributor does not exceed a certain limit and thus protect the vapor distributor.

Optionally, the system may further include sequentially connected a primary diffusion cyclone separator which may be configured to be connected to a third output end of the three-phase separator, a secondary diffusion cyclone separator, a four-way valve, a spray tower, a pipe bundle condenser, a surge tank, a Roots blower and a gas distributor. Bottoms of the primary and secondary diffusion cyclone separators may be configured to be connected to a flap valve and a residual coke collecting bin, respectively. The secondary diffusion cyclone separator may be configured to be connected to the spray tower. A bottom of the spray tower may be configured to be sequentially connected to a tar filter, an oil pump, and a plate heat exchanger via liquid lines. The plate heat exchanger may be configured to be connected to an upper part of the spray tower, a top of which may be configured to be sequentially connected to the pipe bundle condenser, the surge tank, the Roots blower, and the gas distributor via gas lines. The gas can be configured to be blown into the gas distributor by the Roots blower. A part of the gas may be configured to be controlled by the gas distributor to enter the gas mixer where the gas may be mixed with air, and then the mixture may be delivered to the heat carrier heating furnace. The other part of the gas may be configured to be delivered to the gas storage tank.

Optionally, the tar filter may be configured to be sequentially connected to the oil pump, the tar reforming reactor, and the four-way valve via lines, and a reformed gas may be configured to be delivered to the spray tower together with the gasification gas.

Optionally, the system may further include a high-efficiency quadruple cyclone separator, a lower part of which may be configured to be sequentially provided with an ash discharge valve and an ash collecting bin.

Optionally, the heat carrier storage tank may be provided with a thermal insulation shell and a flue gas insulation cavity, within which a spiral baffle for guiding the flue gas may be provided to form a spiral channel for the flue gas. A flue gas inlet and outlet may be provided at a lower and upper part of the thermal insulation shell, respectively, to allow a hot flue gas to enter the spiral channel via the flue gas inlet and then leave it via the outlet. The hot flue gas, derived from the hot exhaust gas generated by the heat carrier heating furnace, can be configured to function to allow the heat carrier storage tank to be heated and kept warm.

Therefore, embodiments of the invention provide systems for producing high-quality gas, which can use an adjustable concentrating solar collection technology in combination with a heat carrier circulation heating process, so as to effectively solve heat requirements of the waste pyrolysis and gasification process, reduce the waste material consumption caused by energy supply, and improve the effective utilization of raw materials. The problems of excessive energy consumption and high production costs during gaseous fuel production can be solved. Furthermore, the gasification system uses vapor generated by the system per se as a gasification agent, without additional introduction of air and can produce gas with a medium or high calorific value, which calorific value may be increased to more than 10 $MJ/m^3$. It is possible to obtain a higher gas quality and a higher $H_2$ content, especially a higher $H_2/CO$ ratio, that may be not available in conventional gasification technology, and the availability of the gas can be therefore significantly improved, creating favourable conditions for higher utilization level at the downstream thereof, which can effectively solve the problems caused by conventional pyrolysis and gasification technology.

BRIEF DESCRIPTION OF DRAWINGS

For the purpose of explaining the embodiments of the present invention or the technical solutions in the prior art more clearly, a brief description of drawings that are provided for the illustration of the embodiments of the invention will be given as follows. It should be understood that the drawings described below show only exemplary embodiments of the present invention and other drawings may be easily obtained by those skilled in the art based on these drawings without creative effort.

DETAILED DESCRIPTION

Embodiments of the present invention will be described in detail below in conjunction with the accompanying drawings. The described embodiments are only exemplary embodiments of the present invention, rather than all the embodiments thereof. All other embodiments obtained by those skilled in the art based on the embodiments of the invention without creative efforts shall fall within the scope of the present invention.

An objective of the present invention is to provide a system for producing high-quality gas, which can save the cost of producing gaseous fuel by pyrolysis and gasification of solid waste material. In order to make the foregoing objective, features, and advantages of the present invention more clear, the present invention will be further described in detail with reference to the accompanying drawings and embodiments hereinafter.

Figure 1:
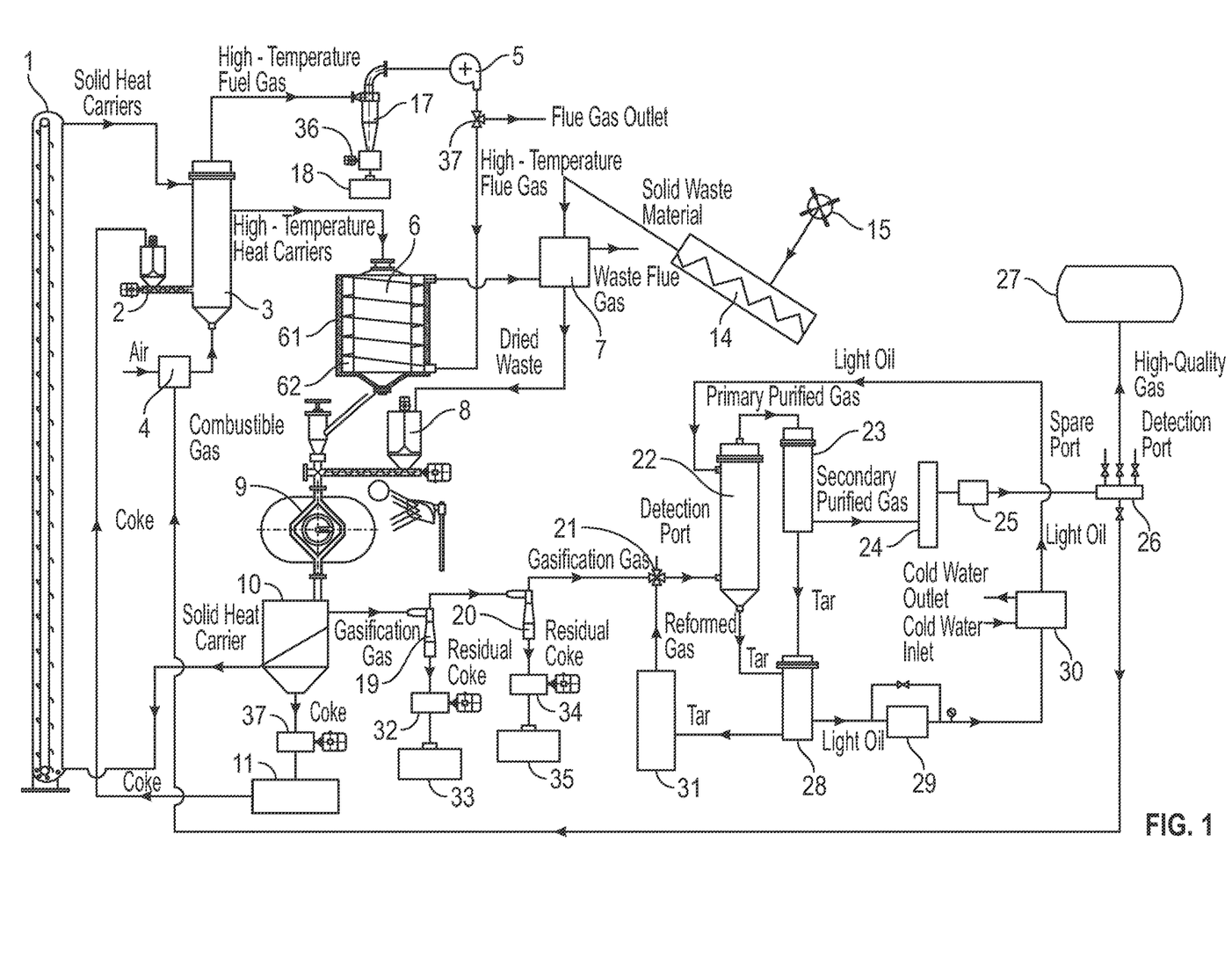
FIG. 1 is a structural diagram of an embodiment of a system for producing high-quality gas according to the present invention.

Referring to the structural diagram of FIG. 1, the system for producing high-quality gas includes a heat carrier hoist 1, a coke feeder 2, a heat carrier heating furnace 3, a gas mixer 4, a high-temperature induced draft fan 5, a heat carrier storage tank 6, a dryer 7, a hopper 8, a concentrating solar collection pyrolysis-gasification reactor 9 having a double-tube structure, a three-phase separator 10, and a coke collecting bin 11.

An upper part of the heat carrier hoist 1 is connected to a first input end of the heat carrier heating furnace 3. A lower part of the heat carrier hoist 1 is connected to a first output end of the three-phase separator 10. A second input end of the heat carrier heating furnace 3 is connected to the coke feeder 2. An input end of the coke feeder 2 is connected to an output end of the coke collecting bin 11. A third input end of the heat carrier heating furnace 3 is connected to the gas mixer 4.

A first output end of the heat carrier heating furnace 3 is connected to an input end of the high-temperature induced draft fan 5, and a second output end of the heat carrier heating furnace 3 is connected to an input end of the heat carrier storage tank 6. An output end of the high-temperature induced draft fan 5 is connected to an input end of the heat carrier storage tank 6 via a three-way valve 37. An output end of the heat carrier storage tank 6 is connected to an input end of the dryer 7. An output end of the dryer 7 is connected to an input end of the hopper 8. An output end of the hopper 8 is connected to an input end of the reactor 9. An output end of the heat carrier storage tank 6 is connected to the input end of the reactor 9 through a heat carrier flow control valve. An output end of the reactor 9 is connected to an input end of the three-phase separator 10. A second output end of the three-phase separator 10 is connected to an input end of the coke collecting bin 11 via a flap valve 37.

Referring to FIGS. 2 to 5, the pyrolysis-gasification reactor 9 may include an adjustable concentrating solar collector 91, a transparent cavity 92, reaction tubes 93, a heat absorption coil 94, a vapor distributor 95, and a water tank 96. The adjustable concentrating solar collector 91 may be used for receiving sunlight from the sun 910 and reflecting the sunlight into the transparent cavity 92, within which is provided with the reaction tubes 93, the heat absorption coil 94, the vapor distributor 95 and the water tank 96. Two reaction tubes 93 may be symmetrically arranged at a center of the transparent cavity 92. A first port 97 may be arranged at an upper center of the transparent cavity 92, and a second port 98 may be arranged at its lower center. Each reaction tube 93 may include a first section 931, a second section 932 communicating with the first section 931 and a third section 933 communicating with the second section 932. Upper ports of both the first sections 931 may communicate with the first port 97, and lower ports of both the third sections 933 may communicate with the second port 98. The heat absorption coil 94 may be arranged at a center between the two reaction tubes 93.

An inlet end of the heat absorption coil 94 may be connected to an outlet end of the water tank 96. An outlet end of the heat absorption coil 94 may be connected to an inlet end of the vapor distributor 95. Outlet ends of the vapor distributor 95 may be connected to the inlet ends of the reaction tubes 93. Cold water in the water tank 96 may be allowed to enter the heat absorption coil 94 from a cold water outlet 962 under the effect of the liquid level difference and be converted into vapor due to evaporation by absorbing heat, which may enter and flow through the vapor distributor 95, and then enter each of the reaction tubes 93. Meanwhile, waste material and solid heat carriers mixed at a set ratio may be fed from the first port 97 into the reaction tubes 93, where a violent pyrolysis and gasification reaction occurs with the vapor during the dropping of the mixture to generate gasification gas and coke. Then, the gasification gas, the coke, and the solid heat carriers may be discharged from the second port 98. For each reaction tube 3, an angle between the first section 931 and the second section 932 may be an obtuse angle α, and an angle between the second section 932 and the third section 933 may be an obtuse angle β, where α=β. The first sections 931 of both the reaction tubes 93 may be provided with respective vapor inlets 99 symmetrically. The heat absorption coil 94 may be implemented as a helical heat absorption coil of copper, which has one end as a cold water inlet 941, which may be connected to the water tank 96, and the other end as a vapor outlet 942, which may be connected to the vapor distributor 95. A stop valve 943 may be provided at the vapor outlet 942 of the heat absorption coil to ensure that the pressure in the heat absorption coil 94 does not exceed a certain limit. A level control valve 961 may be installed inside the water tank 96 to ensure that the level of water can be maintained within a certain range within the heat absorption coil 94, and boil-dry in the heat absorption coil 94 can be prevented. The vapor distributor 95 may be provided with steady flow valves 951, an exhaust valve 952, a vapor inlet 953 and vapor outlets 954. The vapor inlet 953 of the distributor may be connected to the vapor outlet of the heat absorption coil 942, and the vapor outlets 954 of the distributor may be connected to the vapor inlets 99 of the reaction tube. The steady flow valve 951 may be arranged at the vapor outlet 954 of the distributor to adjust the vapor flow. The exhaust valve 952 can be used to ensure that the pressure in the vapor distributor 95 does not exceed a certain limit and thus can protect the vapor distributor 95. The cold water in the water tank can be allowed to enter the helical heat absorption coil of copper under the effect of liquid level difference and be converted into vapor due to evaporation by absorbing heat, which may enter the vapor distributor 95, flow through the steady flow valve 951, and then enter the reaction tubes 93. The steady flow valves 951 can be controlled to adjust the vapor flow, thereby changing a mass flow ratio of vapor to waste and achieving control of the gas composition.

Figure 2:
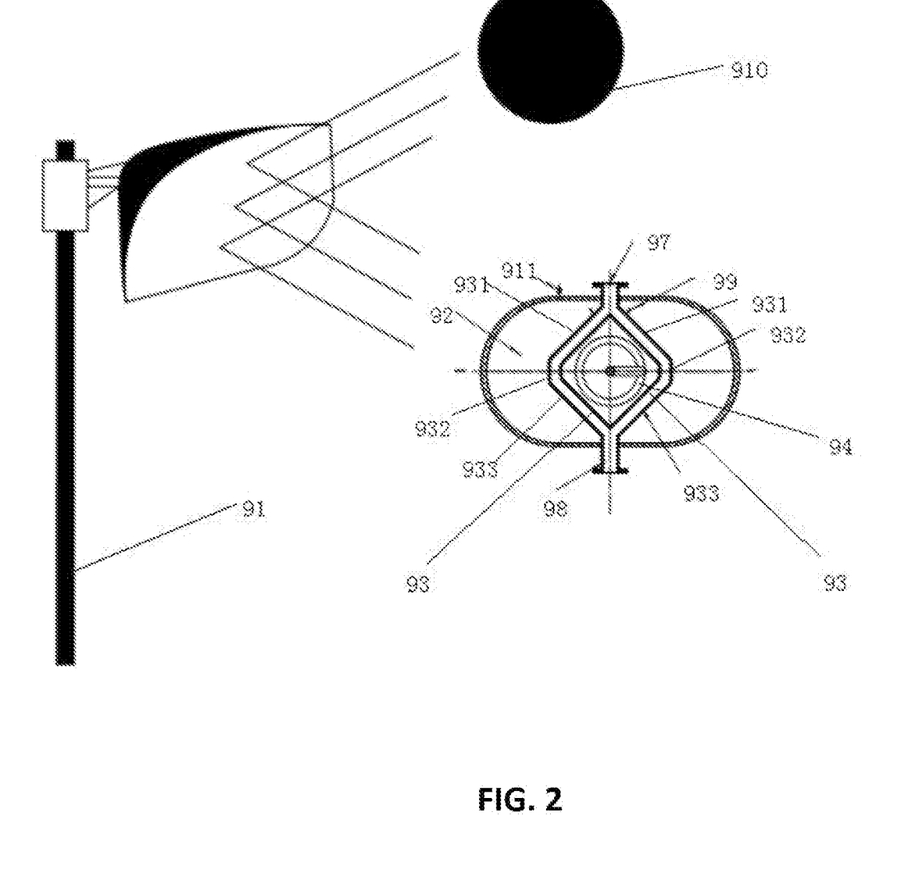
FIG. 2 is a structural diagram of an embodiment of a concentrating solar collection pyrolysis-gasification reactor having a double-tube structure according to the present invention.
Figure 3:
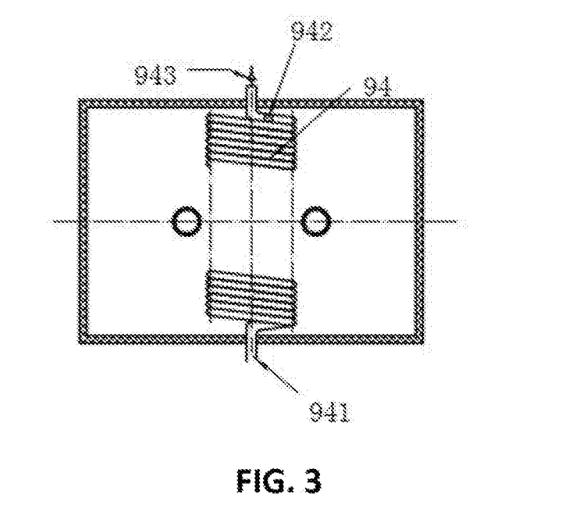
FIG. 3 is a structural diagram of an embodiment of a heat absorption coil according to the present invention.
Figure 4:
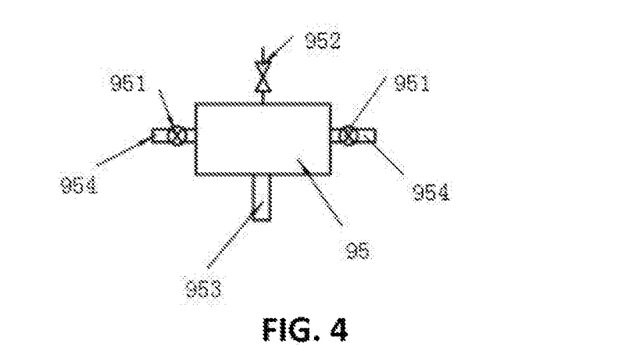
FIG. 4 is a structural diagram of an embodiment of a vapor distributor according to the present invention.
Figure 5:
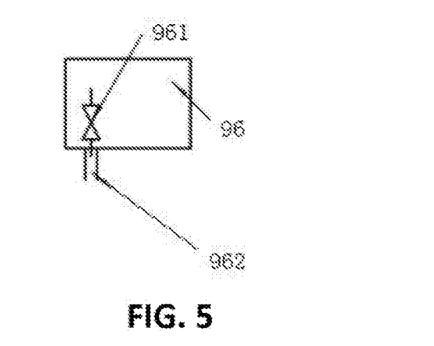
FIG. 5 is a structural diagram of an embodiment of a water tank according to the present invention.

The adjustable concentrating solar collector 91 may be implemented as any one of a rotating parabolic mirror concentrating collector, a Fresnel lens concentrator, a Fresnel reflecting mirror collector, or a tower collector.

The concentrating solar collection pyrolysis-gasification reactor 9 may further include a solar tracking system (not shown) and a one-way valve 911. The solar tracking system may be arranged on the adjustable concentrating solar collector 91. The one-way valve 911 may be arranged on a housing of the transparent cavity 92 and enables gas to be suctioned by a vacuum pump out of the transparent cavity 92 to make the inside of the transparent cavity 92 in a vacuum state, which minimizes overall interior convection and conductive heat losses.

A waste material/solid heat carrier flow control valve (not shown) may be arranged at the first port 97. The solid heat carriers can be implemented as any one of aluminium oxide, zirconium oxide, silicon nitride, silicon carbide and corundum-mullite regenerative balls, and heat-resistant steel balls. The hardness of the heat carriers is much greater than that of the waste material.

The waste material refer to one or two or more combinations of wastes such as agricultural and forestry residues, waste plastics, domestic garbage, sludge, waste circuit boards, and the like.

The system for producing high-quality gas may further include sequentially connected a primary diffusion cyclone separator 19 which may be connected to a third output end of the three-phase separator 10, a secondary diffusion cyclone separator 20, a four-way valve 21, a spray tower 22, a pipe bundle condenser 23, a surge tank 24, a Roots blower 25 and a gas distributor 24. A bottom of the primary diffusion cyclone separator 19 may be connected to a primary flap valve 32 which may, in turn, be connected to a primary residual coke collecting bin 33. A bottom of the secondary diffusion cyclone separator 20 may be connected to a secondary flap valve 34 which may, in turn, be connected to a secondary residual coke collecting bin 35. The secondary diffusion cyclone separator 20 may be connected to the spray tower 22. A bottom of the spray tower 22 may be sequentially connected to a tar filter 28, an oil pump 29, and a plate heat exchanger 30 via liquid lines. The plate heat exchanger 30 may be connected to an upper part of the spray tower 22, a top of which may be sequentially connected to the pipe bundle condenser 23, the surge tank 24, the Roots blower 25, and the gas distributor 26 via gas lines. The gas can be blown into the gas distributor 26 by the Roots blower 25. A part of the gas may be controlled by the gas distributor 26 to enter the gas mixer 4 where the gas may be mixed with air, and then the mixture may be delivered to the heat carrier heating furnace 3. The other part of the gas may be delivered to the gas storage tank 27.

The tar filter 28 may be sequentially connected to the oil pump 29, a tar reforming reactor 31, and the four-way valve 21 via lines, and a reformed gas may be delivered to the spray tower 22 together with the gasification gas, achieving both tar recycling and increased gas throughput.

According to the present invention, the system for producing high-quality gas may further include a high-efficiency quadruple cyclone separator 17 located between the heat carrier heating furnace 3 and provided with an ash discharge valve 36 and an ash collecting bin 18 at its lower part.

The heat carrier storage tank 6 may be of a sleeve type and provided with a thermal insulation shell 61 and a flue gas insulation cavity 62, within which a spiral baffle for guiding the flue gas may be provided to form a spiral channel for the flue gas. A flue gas inlet and outlet may be provided at a lower and upper part of the thermal insulation shell 61, respectively, to allow a hot flue gas to enter the spiral channel via the flue gas inlet and then leave it via the outlet. Due to the heating and insulation effect of the hot flue gas derived from the hot exhaust gas generated by the heat carrier heating furnace 3, it is possible for the system to take full advantage of the heat generated by the hot flue gas from the heat carrier heating furnace 3 to allow the heat carrier storage tank 6 to be heated and kept warm. An output end of the dryer 7 may be connected to the upper flue gas outlet of the heat carrier storage tank 6 via a line so as to dry the waste material by utilizing the residual heat which is contained within the flue gas. An input end of the dryer 7 may be connected to an output end of a scraper conveyor 14, an input end of which may be connected to a waste material crusher 15.

Embodiments of the invention can have the following advantages as compared with the prior art:

(1) enabling a pyrolysis reaction system to be energy-autonomous by using an adjustable concentrating solar collection technology in combination with a heat carrier circulation heating process, and combustible solid waste material to be fast pyrolyzed and (2) gasified under the effect of the heat generated by a direct heating action of the heat carriers in combination with solar heating, thus improving the energy utilization efficiency, while avoiding the problems associated with the conventional methods in which the energy required for the pyrolysis and gasification reaction must be provided by consumption of solid waste material and making effective utilization of the raw material increased by more than 20%; and achieving an effective supply of vapor by the adjustable concentrating solar collection technology and thus allowing the vapor generated by the system per se to serve as a gasification agent without introduction of air and a gas having a middle or high calorific value, in particular of more than 10 MJ/m$^3$, to be produced;

(2) exact controllability of pyrolysis and gasification reaction temperature by controlling a heat carrier flow rate and a solar concentrating intensity by adjusting the heat carrier flow control valve arranged between the heat carrier storage tank in the form of a sleeve and the concentrating solar collection pyrolysis-gasification reactor, and the concentrating solar collector provided for the pyrolysis-gasification reactor, respectively; and effective controllability of a proportion of the combustible composition in the gas and a ratio of $H_2$ to CO by changing a mass flow ratio of vapor to waste material by the steady flow valve of the vapor distributor, which serves to change the vapor flow rate;

(3) enabling the solid heat carriers and the waste particles to be thoroughly mixed with effective contact due to the structure of the reaction tubes, thus improving heat and mass transfer efficiency and eliminating the effect of thermal stress on the system; and since the interior of the transparent cavity of the concentrating solar collection pyrolysis-gasification reactor can be maintained at a vacuum state, minimizing the interior convection and conductive heat losses, and thus allowing a temperature field within the reaction tubes to have small fluctuations and imparting stability to the composition of the gasification gas;

(4) effectively preventing coke particles from adhering to inner walls of the reaction tubes and improving the conversion efficiency of the overall gasification due to the fact that the solid heat carriers in the reaction tubes can be effective on strengthening multi-phase flow, heat and mass transferring, and cleaning inner walls of the reaction tubes, with a cleaning efficiency of more than 95% compared with a cleaning efficiency of less than 60% in the case that no heat carriers would be added into the reaction tubes which may affect the heat transfer efficiency; and achieving recycling of the solid heat carriers which may fall down under gravity and then be mechanically lifted;

(5) obtaining a heat carrier waste heat recovery rate of more than 70% due to the solid heat carrier separation and circulation heating technology used, instead of introducing a large amount of air due to energy supply to the system as traditionally in the gasification processes, to avoid degradation in the quality and heating value of the gas on one hand, and significantly reduce energy consumption in the subsequent gas spray and purification process on the other hand;

(6) fully utilizing the solid waste material and avoiding introduction of foreign fuels as the heat carrier heating furnace may use the solid coke product and a small amount of gas produced by the system for combustion and the heat released during the combustion reaction ensures an effective increase in temperature of the heat carriers, and thus effectively reducing the operating cost of the system and realizing stepped utilization of the hot flue gas generated by the heat carrier heating furnace to heat and warm the heat carrier storage tank and dry the solid waste material, which may significantly reduce the energy loss in the system; and (7) avoiding wastewater discharge problems caused by conventional processes which generally use process water as a flushing and purification medium and thus saving costs as the system can use light oil in the tars produced by itself as a flushing medium and recycle it, and achieving both tar recycling and increased gas throughput by introducing the tars other than the light oil into the reforming reactor to be reformed into combustible gas.

The embodiments in this description are described in a progressive manner. Each embodiment focuses on the differences from other embodiments, while the same or similar parts between the embodiments refer to each other.

Specific examples are used herein to illustrate the principle and embodiments of the present invention, and the above description of the embodiments is set forth solely to assist in understanding the devices and core concept of the present invention; meanwhile, various modifications to certain specific implementations and applications of the present invention may be made without departing from its scope. Overall, this description should not be construed as a limitation on the present invention. Therefore, it will be appreciated that changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A system for producing high-quality gas, said system comprising:
   a heat carrier hoist;
   a coke feeder;
   a heat carrier heating furnace;
   a gas mixer;
   a high-temperature induced draft fan;
   a heat carrier storage tank;
   a dryer;
   a hopper;
   a concentrating solar collection pyrolysis-gasification reactor having a double-tube structure;
   a three-phase separator; and
   a coke collecting bin;
   wherein an upper part of the heat carrier hoist is configured to be connected to a first input end of the heat carrier heating furnace, a lower part of the heat carrier hoist is configured to be connected to a first output end of the three-phase separator, a second input end of the heat carrier heating furnace is configured to be connected to the coke feeder, an input end of the coke feeder is configured to be connected to an output end of the coke collecting bin, and a third input end of the heat carrier heating furnace is configured to be connected to the gas mixer; and
   wherein a first output end of the heat carrier heating furnace is configured to be connected to an input end of the high-temperature induced draft fan, a second output end of the heat carrier heating furnace is configured to be connected to an input end of the heat carrier storage tank, an output end of the high-temperature induced draft fan is configured to be connected to an input end of the heat carrier storage tank, an output end of the heat carrier storage tank is configured to be connected to an input end of the dryer, an output end of the dryer is configured to be connected to an input end of the hopper, an output end of the hopper is configured to be connected to an input end of the reactor, an output end of the heat carrier storage tank is configured to be connected to the input end of the reactor through a heat carrier flow control valve, an output end of the reactor is configured to be connected to an input end of the three-phase separator, and a second output end of the three-phase separator is configured to be connected to an input end of the coke collecting bin through a flap valve.

2. The system according to claim 1, wherein the pyrolysis-gasification reactor comprises:
   an adjustable concentrating solar collector;
   a transparent cavity;
   reaction tubes;
   a heat absorption coil;
   a vapor distributor; and
   a water tank;
   wherein the adjustable concentrating solar collector is configured for receiving sunlight from the sun and reflecting the sunlight into the transparent cavity, within which is provided with the reaction tubes, the heat absorption coil, the vapor distributor and the water tank;
   wherein two reaction tubes are symmetrically arranged at a center of the transparent cavity, a first port is arranged at an upper center of the transparent cavity, and a second port is arranged at a lower center of the transparent cavity, each reaction tube comprising a first section, a second section communicating with the first section and a third section communicating with the second section, upper ports of both the first sections communicating with the first port, and lower ports of both the third sections communicating with the second port; and
   wherein the heat absorption coil is arranged at a center between the reaction tubes, an inlet end of the heat absorption coil is configured to be connected to an outlet end of the water tank, an outlet end of the heat absorption coil is configured to be connected to an inlet end of the vapor distributor, outlet ends of the vapor distributor are configured to be connected to the inlet ends of the reaction tubes, cold water in the water tank is allowed to enter the heat absorption coil from a cold water outlet under the effect of the liquid level difference and be converted into vapor due to evaporation by absorbing heat, which is configured to enter and flow through the vapor distributor, and then enter each of the reaction tubes; meanwhile, waste material and solid heat carriers mixed at a set ratio are configured to be fed from the first port into the reaction tubes, where a violent pyrolysis and gasification reaction occurs with the vapor during the dropping of the mixture to generate gasification gas and coke, and the gasification gas, the coke, and the solid heat carriers are configured to be then discharged from the second port.

3. The system according to claim 2, wherein for each reaction tube, an angle between the first section and the second section is an obtuse angle $\alpha$, and an angle between the second section and the third section is an obtuse angle $\beta$, wherein $\alpha=\beta$.

4. The system according to claim 3, wherein the first sections of both the reaction tubes are provided with respective vapor inlets symmetrically.

5. The system according to claim 4, wherein the heat absorption coil is implemented as a helical heat absorption coil of copper, which has one end as a cold water inlet configured to be connected to the water tank, and the other end as a vapor outlet configured to be connected to the vapor distributor and provided with a stop valve.

6. The system according to claim 5, wherein:
the vapor distributor is provided with steady flow valves, an exhaust valve, a vapor inlet and vapor outlets;
the vapor inlet of the distributor is configured to be connected to the vapor outlet of the heat absorption coil, and the vapor outlets of the distributor are configured to be connected to the vapor inlets of the reaction tube;
the steady flow valve is arranged at the vapor outlet of the distributor to adjust a vapor flow; and
the exhaust valve is configured to ensure that a pressure in the vapor distributor does not exceed a certain limit and thus protect the vapor distributor.

7. The system according to claim 1, further comprising, in sequential connection, a primary diffusion cyclone separator configured to be connected to a third output end of the three-phase separator, a secondary diffusion cyclone separator, a four-way valve, a spray tower, a pipe bundle condenser, a surge tank, a Roots blower and a gas distributor;
wherein bottoms of the primary and secondary diffusion cyclone separators are configured to be connected to a flap valve and a residual coke collecting bin, respectively;
wherein the secondary diffusion cyclone separator is configured to be connected to the spray tower;
a bottom of the spray tower is configured to be sequentially connected to a tar filter, an oil pump, and a plate heat exchanger via liquid lines;
wherein the plate heat exchanger is configured to be connected to an upper part of the spray tower, a top of which is configured to be sequentially connected to the pipe bundle condenser, the surge tank, the Roots blower, and the gas distributor via gas lines;
the Roots blower is configured to blow the gas into the gas distributor;
the gas distributor is configured to control a part of the gas so as to enter the gas mixer where the gas is mixed with air, and then the mixture is delivered to the heat carrier heating furnace; and
the gas distributor is configured to deliver the other part of the gas to the gas storage tank.

8. The system according to claim 7, wherein the tar filter is configured to be sequentially connected to the oil pump, a tar reforming reactor, and the four-way valve via lines, and wherein a reformed gas is configured to be delivered to the spray tower together with the gasification gas.

9. The system according to claim 7, further comprising a high-efficiency quadruple cyclone separator, a lower part of which is sequentially provided with an ash discharge valve and an ash collecting bin.

10. The system according to claim 7, wherein:
the heat carrier storage tank is provided with a thermal insulation shell and a flue gas insulation cavity, within which a spiral baffle for guiding the flue gas is provided to form a spiral channel for the flue gas;
a flue gas inlet and outlet are provided at a lower and upper part of the thermal insulation shell, respectively, to allow a hot flue gas to enter the spiral channel via the flue gas inlet and then leave it via the outlet; and
the hot flue gas, derived from a hot exhaust gas generated by the heat carrier heating furnace, is directed so as to allow the heat carrier storage tank to be heated and kept warm.

* * * * *